United States Patent [19]

Watanabe

[11] Patent Number: 4,460,636
[45] Date of Patent: Jul. 17, 1984

[54] OPTICAL INFORMATION RECORD MEMBER

[75] Inventor: Kenjiro Watanabe, Shin, Japan

[73] Assignee: Sony Corporation, Tokyo, Japan

[21] Appl. No.: 361,384

[22] Filed: Mar. 24, 1982

[30] Foreign Application Priority Data

Mar. 27, 1981 [JP] Japan .................................. 56-45174
May 11, 1981 [JP] Japan .................................. 56-70352

[51] Int. Cl.³ .......................... B41M 5/00; B41M 5/26
[52] U.S. Cl. .................................. 428/212; 346/76 L; 346/135.1; 428/209; 428/213; 428/215; 428/216; 428/433; 428/913
[58] Field of Search .......................... 346/76 L, 135.1; 428/209, 213, 215, 216, 332, 333, 913, 195, 212, 336; 430/945

[56] References Cited

U.S. PATENT DOCUMENTS 3,716,844  2/1973  Brodsky ............................... 430/945
3,959,799  5/1976  Gambino et al. .................... 430/945

*Primary Examiner*—Bruce H. Hess
*Attorney, Agent, or Firm*—Hill, Van Santen, Steadman & Simpson

[57] ABSTRACT

An optical information record member is provided which comprises a substrate, a first layer formed on the substrate made of a material having high absorptance of an incident light of a predetermined wavelength in which a part of the incident light is converted to heat, and a second layer formed on the first layer made of a material in which an optical characteristic for a light having a predetermined wavelength is changed by irradiation of the incident light together with the heat generated in the first layer, wherein an information signal can be recorded on the second layer by the change of the optical characteristic of the second layer.

5 Claims, 12 Drawing Figures

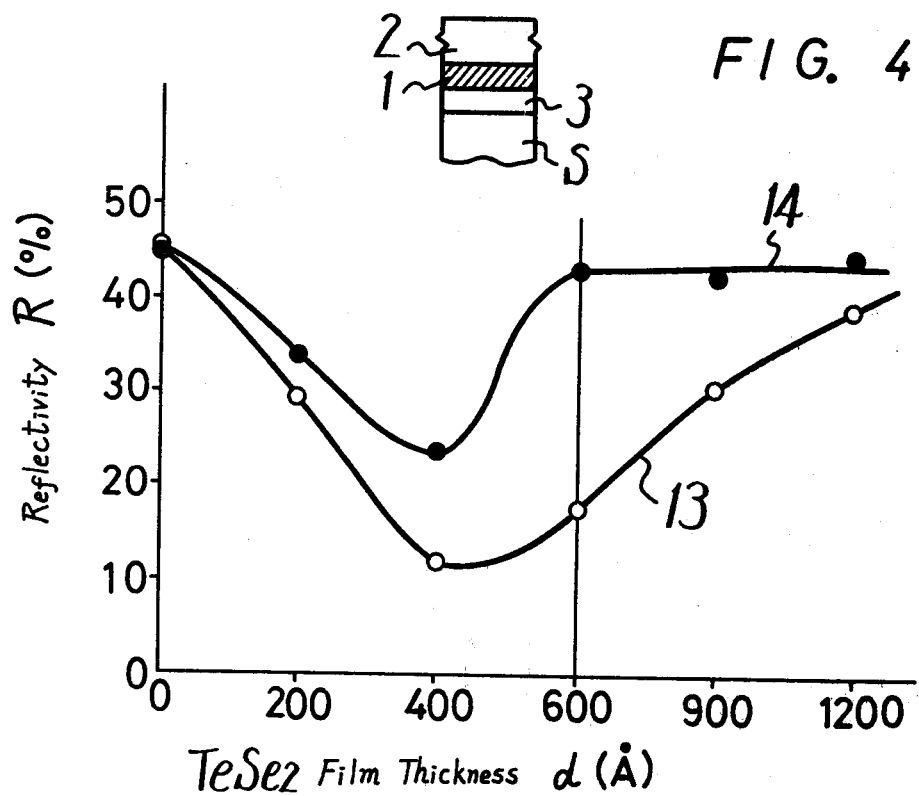
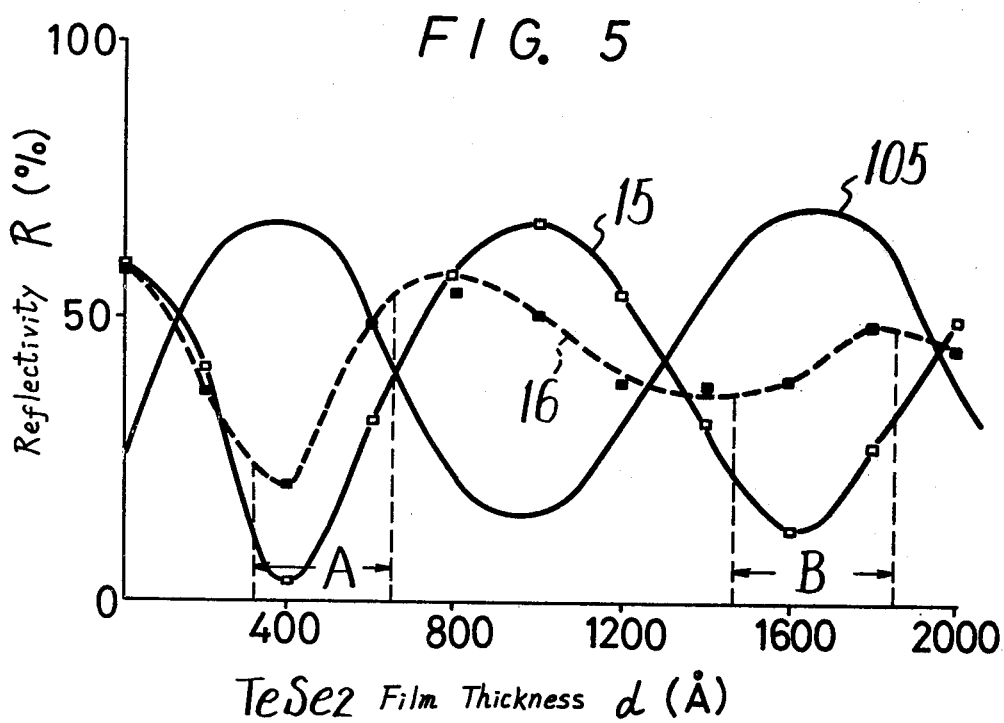

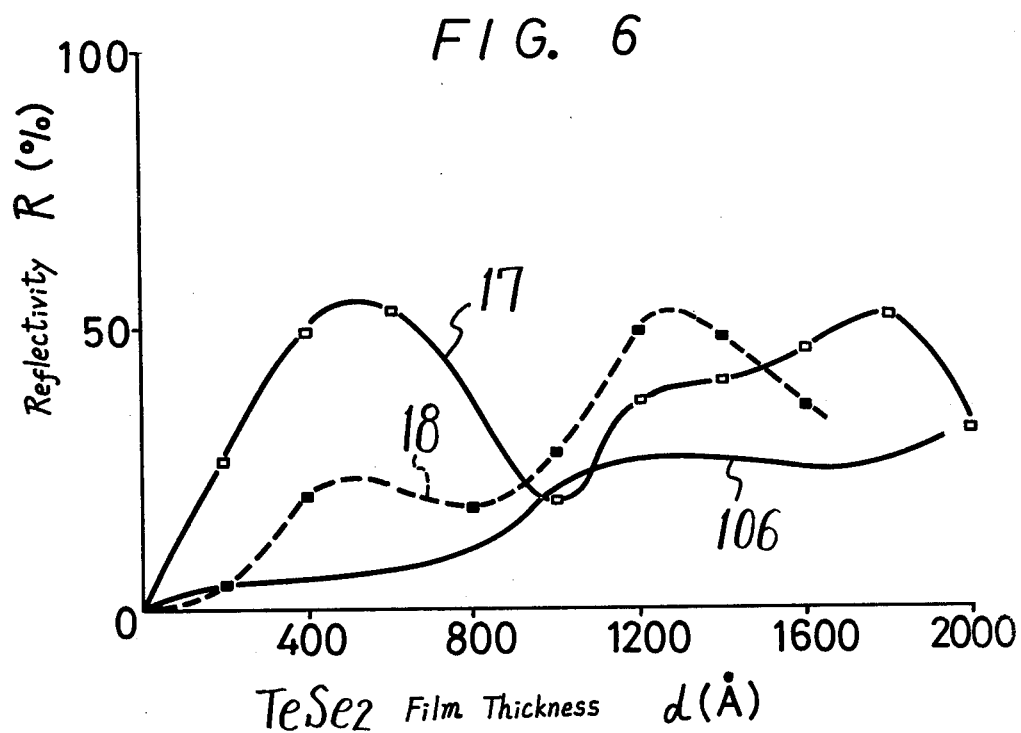
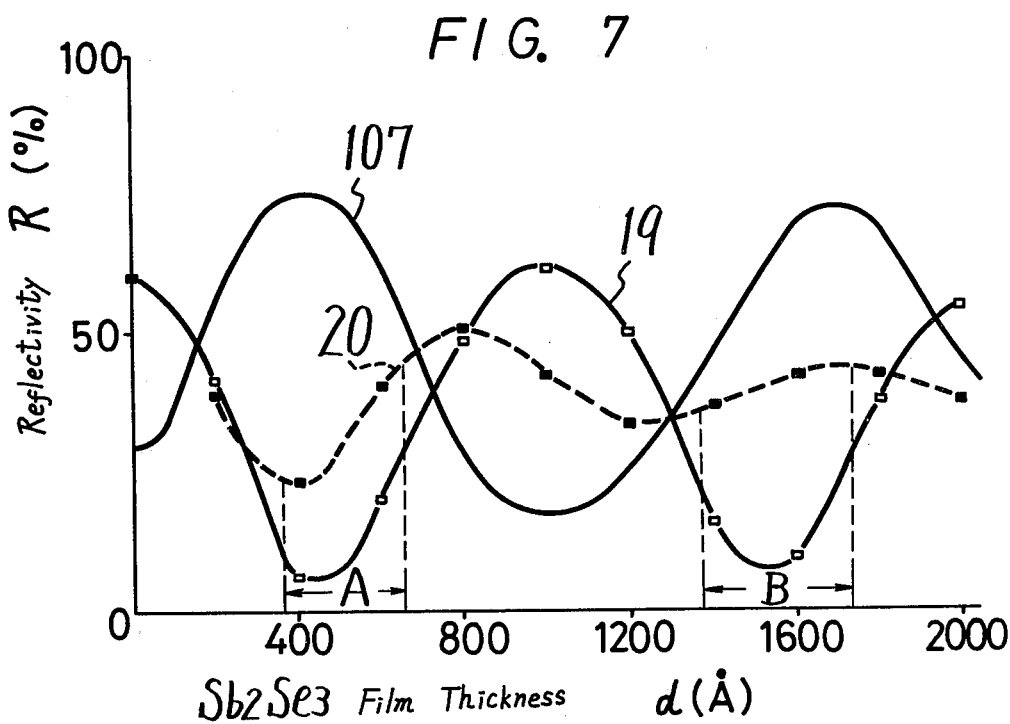

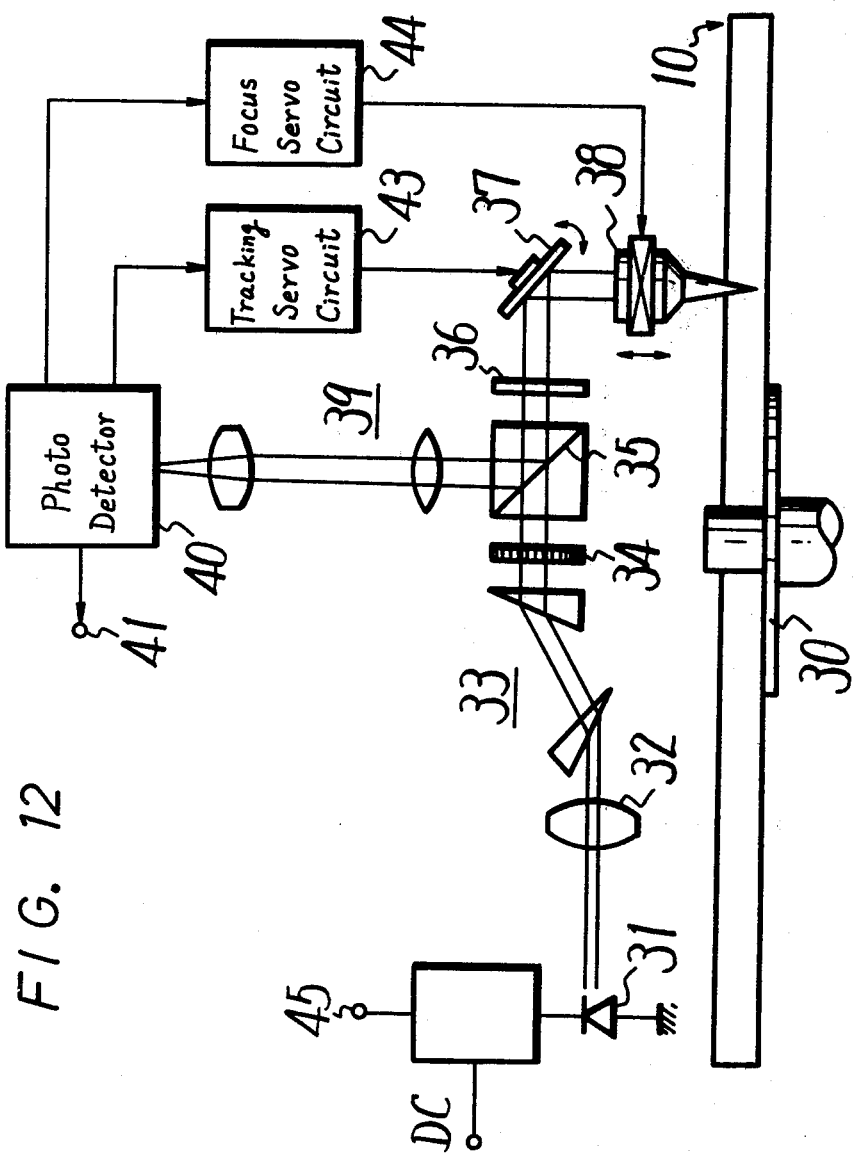

…

OPTICAL INFORMATION RECORD MEMBER

BACKGROUND OF THE INVENTION

1. Field of the Invention

The present invention relates generally to an optical information record member and is directed more particularly to an optical information record member in which an optical state of a record layer, namely, a reflectivity or transmissivity of the record layer is changed so as to record and/or reproduce the information.

2. Description of the Prior Art

Recently, a system to record information on an optical information record member by changing the optical state of its record layer, for example, forming a series of pits and reading the information optically therefrom has been put into practical use in a manner that it has been applied to a so-called video disk or digital audio disk. In the available system, users can only read out the recorded information from the disk. Although various information record members in which users in general can write any desired information optically on its medium such as the disk have been proposed, they have not been put into practical use yet.

As a prior art information record member on which desired information can be written or recorded, there is proposed one wherein a record material layer is formed of, for example, a thin metal film having a low melting temperature such as bismuth Bi and tellurium Te on which a laser beam which is modulated according to an information signal to be recorded is irradiated so as to selectively melt or fuse the record layer, whereby a through-hole, namely a record pit is formed on a fused portion of the record layer to perform recording the information.

But, since the optical information record member using such recording mode as to form the record pit as described above needs large power in writing the information thereon or it is quite difficult to control the shape of the record pit originated from, for example, a fusing, such record member has a drawback that a noise level becomes high and its resolution is low, that is, a high density recording is difficult to obtain.

OBJECTS AND SUMMARY OF THE INVENTION

Accordingly, it is an object of the present invention to provide an optical information record member on which information can be written or recorded.

It is another object of the present invention to provide an optical information record member on which information can be written or recorded with less recording power.

It is a further object of the present invention to provide an optical information record member which has an excellent resolution so that a high density recording of information becomes possible.

According to one aspect of the present invention, there is provided an optical information record member which comprises:

a substrate;

a first layer formed on said substrate made of a material having high absorptance of an incident light of a predetermined wavelength in which a part of said incident light is converted to heat; and a second layer formed on said first layer made of a material in which an optical characteristic for light having a predetermined wavelength is changed by irradiation of said incident light together with the heat generated in said first layer, wherein an information signal can be recorded on said second layer by the change of the optical characteristics of said second layer.

The other objects, features and advantages of the present invention will become apparent from the following description taken in conjunction with the accompanying drawings through which the like references designate the same elements and parts.

BRIEF DESCRIPTION OF THE DRAWINGS

FIGS. 3, 4, 5, 7, 9 and 11 are graphs each showing a result in measuring a reflectivity and an absorptance of an example of the optical information record member according to the present invention;

FIGS. 6, 8 and 10 are graphs each showing a result in measuring a reflectivity and an absorptance of a comparison example for the present invention; and FIG. 12 is a diagram schematically showing an example of a system for recording and/or reproducing an information from an optical information record member according to the present invention.

DESCRIPTION OF THE PREFERRED EMBODIMENTS

In the present invention, recording information on an optical information record member is carried out by changing an optical characteristic, such as transmissivity and/or reflectivity of a recording layer by irradiating a laser beam modulated according to an information signal to be recorded, instead of by forming a series of pits by melting, fusing or evaporating the recording layer in the conventional method. In the present invention high resolution and high density recording can be achieved and a recording power of the laser beam required can be reduced. In addition, especially when interference effect of recording laser beam is taken in consideration upon recording, it is possible to record the information when the recording layer has a low reflectivity and to make recorded portions of the recording layer after recording has an increased reflectivity. By the above consideration, it is further possible to achieve a higher resolution and higher density recording and to reduce the recording power more.

Figure 1:
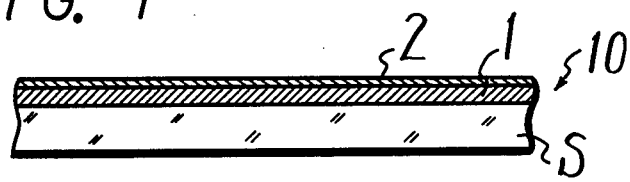
FIGS. 1 and 2 are enlarged cross-sectional diagrams each showing an optical information record member according to the present invention.

With reference to FIG. 1, an example of the optical information record member according to the present invention will be described.

The optical information record member 10 is formed of a substrate S which is made of glass or resinous material such as acrylic resin on which a first layer 1 and a second layer 2 are formed successively as shown in FIG. 1. An optical characteristic of the second layer 2 is changed by heating, which will be explained in detail below.

The first layer 1 is composed of a material having such an effect that when this layer 1 is formed as a single layer, it presents a relatively high reflectivity for a particular wavelength of a recording light beam such as for 8000 Å of a semiconductor laser light beam and also it has a higher absorptance for the aforesaid recording light beam, for example, the semiconductor laser light as compared with absorptance of the second layer 2, in which this record light is converted to heat by the absorption.

Also, more preferably, the material of this first layer 1 is selected from a material having a relatively low thermal conductivity.

Further, this first layer 1 can be formed of such a material as bismuth Bi or tellurium Te or alloy thereof which will not be caused undesirable physical or chemical changes of the layer at a temperature of 200° C. where the optical characteristic of the second layer is varied.

The thickness of this first layer 1 is selected, as, for example, 50 Å to 1500 Å. This is mainly because if the thickness of the first layer 1 is selected to be less than 50 Å, the first layer 1 becomes a monomolecular layer, so that the light absorptance is lowered and the light transmissivity becomes large. Also, if the aforesaid thickness is selected to be more than 1500 Å, such a phenomenon will occur partially in the first layer 1 that the heat induced in the first layer 1 is not effectively transferred to the second layer 2 adjacent thereto thus resulting in a loss of power.

The second layer 2 is not required to have a large absorptance of the recording light beam of the particular wavelength, and has a small absorptance as compared with that of the first layer 1.

In this case, to form this second layer 2, can be used a material whose optical characteristic such as refractive index, reflectivity, absorptance and so on will be changed mainly by heating or occasionally by an irradiation of light as well as heat, for example, a single substance of As, Se, Sb, Te, In, Cd and S or an alloy thereof such as $TeSe_2$, $Sb_2Se_3$, $Sb_2Te_3$, InSe, $In_2Te_3$, $In_2Se_3$, $CdTeSe_3$, CdSe, $Sb_2TeSe_5$ and so forth. In addition, other alloys containing tellurium Te such as $In_2Te_3$ and $Sb_2Te_3$ can be employed.

In this case, the above compounds each are not limited to the stoichiometric ratio in the respective chemical formulae, thus in Te-Se system, for example, an amount of Te in the alloy can be selected as 10 to 80 atomic % and remaining part is Se, in Sb-Se system, an amount of Sb in the alloy can be selected as 10 to 80 atomic %, in Sb-Te system, an amount of Sb in the alloy can be selected as 20 to 80 atomic %, in In-Se system, an amount of In in the alloy can be selected as 10 to 80 atomic % and in In-Te system, an amount of In in the alloy can be selected as 20 to 80 atomic %. In Sb-Te system, for example, $Sb_2Te_3$ one of In, Mn, Cu and Cd can be contained up to 40 atomic % of the alloy. Then, it was proved that all of these compounds could present large changes of optical characteristics thereof through heating.

In the present invention, the material used to form this second layer 2 is selected in such a fashion that its optical characteristic such as reflectivity, transmissivity, refractive index and so on may be varied more than 10% by the heat originated from the irradiation of the recording light beam. Also, the thickness of this second layer 2 has to be selected in a range of more than 200 Å but less than 1600 Å. More precisely, if the thickness of the second layer 2 is thinner than 200 Å, a satisfactory change of optical characteristic can not be achieved while if it is beyond 1600 Å, there appears the thick portion in which the optical characteristic will not be varied even by the irradiation of the recording laser light, which will presumably cause an S/N (signal-to-noise) ratio to be deteriorated.

Although the material and thickness of the second layer 2 are selected from the range as described above, it is more preferable that they are selected in consideration of the conditions as follows.

That is, the thickness of the second layer 2 is selected such that under the state that the second layer 2 is laminated on the first layer 1, the reflectivity of the second layer 2 for the record light may present a relatively small value by interference effect in the state before the information is recorded on this optical information record member and in the state where the aforesaid optical characteristic of the second layer 2 was varied after the information is recorded thereon, that reflectivity of recorded portions of the recording layer may be increased or raised for more than 15% or desirably more than 20% as compared with that before the information is recorded thereon.

More specifically, a light irradiated on the second layer 2 and then reflected on its surface interferes with a light reflected from an boundary surface of the first layer 1, which shows a relatively large reflectivity when the first layer 1 is formed as a single layer, then the reflectivity of the record member is lowered. At the same time, the thickness of the second layer 2 is selected in such a manner that after the optical characteristic of the recorded portions of the second layer 2 is changed, the reflectivity of the record member originated from the recording may become more than 15% or desirably more than 20% as compared with that prior to the recording.

In this case, since the characteristics of the first layer 1 and the second layer 2 are selected based upon a relative relation therebetween as set forth above, the material used as the second layer 2 discussed before can have the same heavy metal constituent as the material which may construct the first layer 1. For example, if the second layer 2 is made of $Sb_2Se_3$, for the first layer 1 therebeneath, it is possible to utilize $Sb_2Te_3$ which, under the state of single layer, shows higher reflectivity of light than that of $Sb_2Se_3$ and also high light absorptance.

To record the information on the optical information record member according to the present invention as described above, a semiconductor laser (whose wavelength is 8000 Å) light with the power of, for example, 10 mW, is irradiated on the record member from the side of the second layer 2 to relatively scan across the same, in which the laser light is irradiated so as to form a pattern responsive to the information to be recorded. At this time, as described above, due to the fact that the thickness of the second layer 2 was already selected such that the second layer 2 might present a low reflectivity for the recording light beam, which in this case is the semiconductor laser light, the recording light is converted to a heat energy efficiently within the second layer 2 to vary its optical characteristic at the portions on which the laser light is irradiated.

On the other hand, a part of the recording light penetrated into the first layer 1 is also converted to the heat energy therein since this first layer 1 is formed of a material which shows a high absorptance for the recording light. Accordingly, by this heat energy the second layer 2 laminated on the first layer 1 is heated efficiently, by which the portions in the second layer 2 where the recording light irradiates are heated at, for example, about 200° C. to vary optical characteristic thereof in response to the irradiating pattern of the record light, thus the reflectivity therein being increased.

Reading out or reproducing the information from the optical information record member on which the optical pattern is formed as described before is performed through reading out or reproducing the information originated from a difference of reflectivity, transmissivity or refractive index in the second layer 2. This read-out or reproduction of the information can similarly be carried out by using the semiconductor laser light. In this case, it is sufficient that the power for the read-out of the information is selected to be a smaller power, for example, 3 mW as compared with that upon the recording of the information. Since the laser power for reproduction is selected not enough to record a signal on the recording layer it is avoided that the optical condition is changed mistakenly by the read out light.

While in the aforesaid embodiment where the second layer 2 is formed on the first layer 1, the second layer 2 may be formed on the base or substrate S on which the first layer 1 can be formed.

Figure 2:
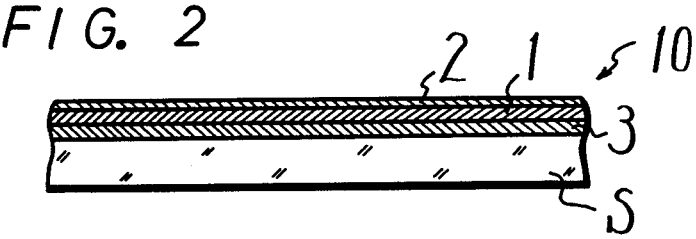

Further as shown in FIG. 2, a layer of heat insulating material, for example, Se layer 3 may be provided between the substrate S and the first layer 1. The layer 3 avoids the heat conduction of the heat generated in the first layer passing from the first layer 1 to the substrate.

In this case, to record and/or reproduce the information on and/or from the optical information record member 10 can be performed by an apparatus, an outlined arrangement of which is schematically shown in FIG. 12.

In an example of FIG. 12, the optical information record member 10 is located on a rotary base 30 and rotated along an axis. Reference numeral 31 denotes a laser light source such as a semiconductor laser from which a laser light is derived and then introduced through a collimator lens 32→a prism 33→a grating 34→a beam splitter 35→a quarter plate 36→a tracking mirror 37→an objective lens 38 to the record member 10 so as to irradiate its recording layer.

On the other hand, when reproducing the signal from the record member, a reflected light of the laser light irradiated on the record member 10 is passed through the objective lens 38→the tracking mirror 37→the quarter plate 36→the beam splitter 35→a lens system 39 to a photo detector 40, whereby its optical information is detected therefrom and then converted to an electric signal to thereby allow its detecting signal to be produced at an output terminal 41 led out therefrom.

Numerals 43 and 44 designate a tracking servo circuit and a focusing servo circuit, respectively, whose servo signals each are fed both to a rotation mechanism of the tracking mirror 37 and a focus adjusting mechanism of the objective lens 38 to adjust the tracking and focusing thereof. Numeral 45 denotes a source of the record information signal. The record signal therefrom modulates the power of the laser 31 so that upon recording, the laser 31 derives the modulated laser beam and the beam is irradiated on the record member 10 in the mode previously mentioned.

Further, examples of the optical information record member according to the present invention and comparison examples therefor will hereinafter be described with reference to the drawings in which like references corresponding to those in FIGS. 1 and 2 designate the same elements and parts.

EXAMPLE 1

Figure 3:
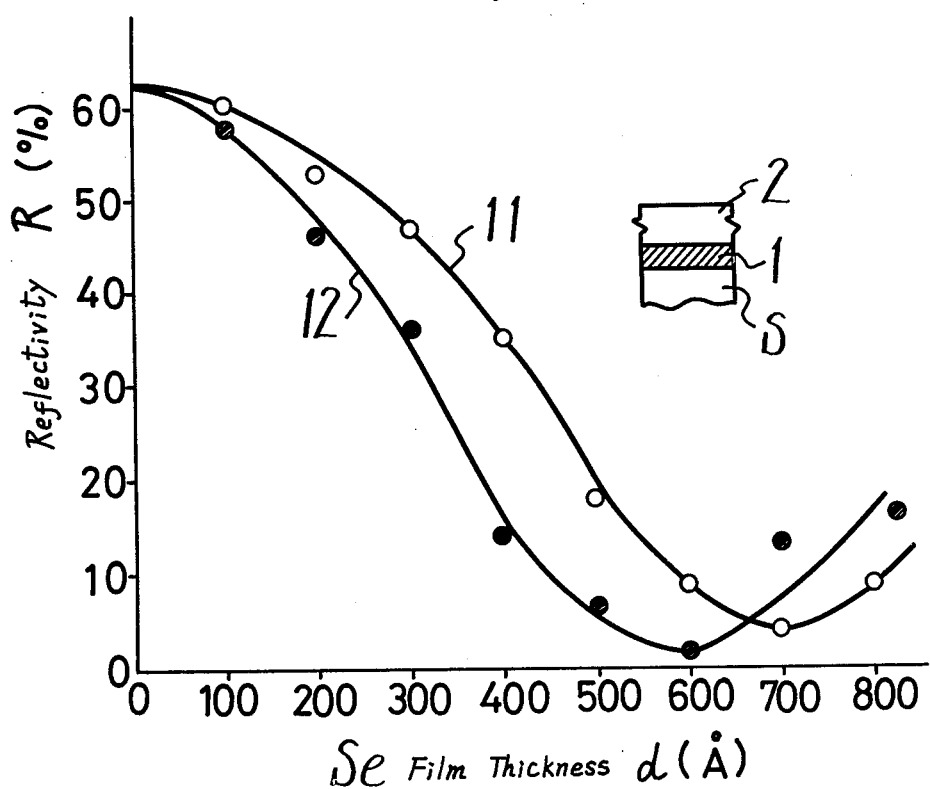

As shown by a cross-sectional view in FIG. 3, such an optical information record member is provided in which the first layer 1 made of tellurium Te having a thickness of 400 Å is formed on the glass base or substrate S on which the second layer 2 made of Se is further laminated.

FIG. 3 is a graph showing a relation between a thickness d of the second layer and the reflectivity R of the record medium, when a semiconductor laser light beam having a wavelength of 8000 Å is irradiated from a side of the second layer. In this case, a curve 11 in FIG. 3 indicates the reflectivity of the record member 2 before the recording by the laser light and a curve 12 indicates the reflectivity R of the record member in the case where the second layer 2 was subjected to a heat treatment at 200° C. by irradiating the laser beam, in other words, after the information is written or recorded thereon. From the results, it is understood that the reflectivity R, namely, the transmissivity of the record member is varied through the heat treatment at 200° C., that is, the recording of the information.

In this case, the reason why the reflectivity R of the record member is changed by the film thickness of Se, namely, the film thickness of the second layer 2 is caused by the interference effect of the film in which when the film thickness of the second layer 2, namely, the film thickness of Se is 700 Å, effect nearly same as an effect of a so-called anti reflection coating is presented.

Taking advantage of the change of the optical characteristic, namely reflectivity of the second layer 2 before and after the heat treatment, namely, before and after the laser light is written and/or read out therefrom, when the second layer 2 is made of selenium Se and its thickness is selected to be 400 Å, as it will be clear from the graph of FIG. 3, it is understood that since the reflectivity of 35% prior to recording is changed into that of 15% after recording, the optical record information can be read out or reproduced from the optical information record member through the use of a difference between these reflectivities.

EXAMPLE 2

As shown in FIG. 4 in a cross-sectional view, such an optical information record member is formed that selenium Se film having a thickness of 400 Å is coated on the glass base or substrate S as the heat insulating layer 3 on which the first layer 1 made of tellurium Te film having a thickness of 670 Å is coated on which the second layer 2 made of TeSe$_2$ is further coated.

FIG. 4 shows a result in which the thickness d of the TeSe$_2$ film or the second layer 2 is changed to measure the reflectivity R of the record member for the semiconductor laser light (whose wavelength is 8000 Å). In FIG. 4, a curve 13 indicates the reflectivity R of the record member before the heat treatment, namely, before the record information is written therein and a curve 14 indicates the reflectivity R of the second layer 2 after the heat treatment at 200° C., namely, after the record information was written or recorded thereon, respectively. In this case, since a large difference of the reflectivities is brought before or after the heat treatment when the thickness of the second layer 2 is, for example, 600 Å, if the thickness of the second layer 2 is selected as the aforesaid thickness, 600 Å, the optical record information can be recorded and/or reproduced with high sensitivity.

In this case, the optical information record member according to the examples of the present invention as set forth above, for example, the video disk or digital audio disk could carry out its recording at a speed represented by its rotation number of about 1800 rpm when the recording information is carried out by the semiconductor laser whose power is, for example, 10 mW as mentioned before. Also, in the read-out or reproduction of the recorded information, it could perform the reproduction only without causing the recording to be carried out again when the power of the semiconductor laser was sufficiently lower than the power upon recording, for example, 3 mW.

Also, the optical record information can be read out or reproduced from this optical information record member on the basis of any one of the systems of a transmittance or reflection type.

Further, when the material of the second layer 2 was selected such that the record member after recording might achieve a change of the optical characteristic such as the transmissivity (absorptance) at its record portion or area more than 10% as compared with that of the record member before recording, the reproduction with high S/N ratio could be achieved.

EXAMPLE 3

An optical information record member is prepared in which the first layer made of tellurium Te having a thickness of 400 Å is formed on the glass substrate S on which the second layer 2 made of $TeSe_2$ is formed by vacuum evaporation. In this manner several samples are made by varying the thickness of the second layer. The reflectivity and the absorptance are measured on the samples before recording information, and the measured results are shown in FIG. 5 in which a curve 15 indicates the reflectivity and a curve 105 indicates the absorptance of the record member for the recording laser light having a wavelength of 8000 Å. It is understood from the results that the reflectivity R of the record member shows minimum values when the thickness d of the second layer is selected 400 Å and 1600 Å where a remakable interference effect occurs.

Then laser light beam having a wavelength of 8000 Å with a power of 10 mW derived from a semiconductor laser is irradiated to the record member from the side of the second layer 2 to write an information signal. The reflectivity is measured on the recorded member which result is indicated by a curve 16 in FIG. 5.

In this case, to achieve a high efficiency of recording, it is desirable that the thickness d of the second layer 2 is selected as a thickness in which its reflectivity R can show a value as small as possible on the curve 15, in other words, as the thickness equivalent to each trough of the curve 15. Further, it is desired that as a range of the reflectivity R for achieving a high reproducing sensitivity, the difference of the reflectivity R between before and after the optical information is recorded is selected to be more than 15%. In this case, it is sufficient that the thickness d of the second layer 2 is selected in a range A ($d \approx 360$ Å to 650 Å) and a range B ($d \approx 1470$ Å to 1850 Å) in the range of the thickness seen in FIG. 5.

However, in this case, in view of increasing the recording sensitivity, it is more preferable that a thermal capacity of the recording portion or area where the optical information is recorded is made small. In addition, as a range in which the semiconductor laser of 10 mW can record a video signal with its relative rotation speed of 1800 rpm, the thickness d of the second layer 2 is selected in a range from 400 Å to 600 Å and hence it is selected to be the thickness substantially within the range A in FIG. 5.

In FIG. 5, it is shown that the reflectivity R is increased after recording when the thickness of the second layer 2 is around 1000 Å, however as seen from the curve 105, the absorptance is small when the thickness of the second layer is around 1000 Å, high recording efficiency can not be expected.

Comparison Example 1

In this example, such an optical information record member is prepared in which a single layer of $TeSe_2$ film corresponding to the second layer 2 in the example 3 is coated alone on the glass substrate S. In this case, results in measuring the characteristic or reflectivity R of the $TeSe_2$ film for the film thickness before or after the laser light is irradiated from the semiconductor laser same as that described in FIG. 5 became those as illustrated by curves 17 and 18 in FIG. 6.

Although even in this case, the film thickness of the $TeSe_2$ layer is selected so that a large difference of the reflectivity R between before and after the optical information is recorded can be obtained, particularly in this case, since a region or area in which a difference of reflectivity R of more than 15% can be achieved stays in the vicinity of a peak portion of the curve 17, in other words, a portion in which the reflectivity R of the $TeSe_2$ film before the optical information is recorded is highest, a large record power is required thus resulting in a low efficiency of the recording. This can be understood from the representation made by a curve 106 in FIG. 6 showing that the absorptance of the record member before the optical information is recorded is quite low.

EXAMPLE 4

In this example, such an optical information record member is prepared in which in the same manner as that of the example 3 the first layer 1 made of tellurium Te vacuum-evaporated film of 400 Å thick is formed on the glass substrate S on which the second layer 2 made of $Sb_2Se_3$ is formed. In this case, results in measuring the reflectivity R of the record member for its thickness d before the semiconductor laser beam whose wavelength is 8000 Å is irradiated thereon (before the optical information is recorded) and after the same is irradiated thereon (after the optical information was recorded) are similarly shown by curves 19 and 20 in FIG. 7.

In this case, like the description in FIG. 5, the range in which the high recording and/or reproducing sensitivity can be achieved, in other words, the range of the film thickness d of the $Sb_2Se_3$ film in which before the optical information is recorded a low reflectivity is presented and after the optical information is recorded a high reflectivity of more than 15% as compared with the reflectivity of before the recording of the optical information is ranges shown by letters A and B in FIG. 7. Also, in this case, in view of the recording of the video signal, it is desirable that the film thickness d of the $Sb_2Se_3$ is selected as the thickness within the range A.

In FIG. 7, a curve 107 indicates the absorptance of the optical information record member before the optical information is recorded. From this representation, it is apparent that when the thickness of the $Sb_2Se_3$ film or the second layer 2 is selected as around 1000 Å, the reflectivity R changes greatly but the absorptance of the light is small so that the recording efficiency is poor.

Comparison Example 2

In this example, such an optical information record member is prepared in which a single layer formed of the $Sb_2Se_3$ film corresponding to the second layer 2 in the example 4 is coated on the glass substrate S. Results in measuring the reflectivity R of the second layer 2 for the film thickness d before and after it is irradiated by the semiconductor laser light with the wavelength 8000 Å are illustrated by curves 21 and 22 respectively in FIG. 8. In this case, like in FIG. 5, a range in which the high recording and/or reproducing sensitivity can be achieved, namely, a range of the film thickness d of the $Sb_2Se_3$ film in which before the optical information is recorded, a low reflectivity is presented after the optical information is recorded, a high reflectivity of more than 15% as compared with the reflectivity before recording does not exist in the vicinity of the thickness of the range from 400 Å to 600 Å previously mentioned which is required by the recording of the video signal.

Figure 8:
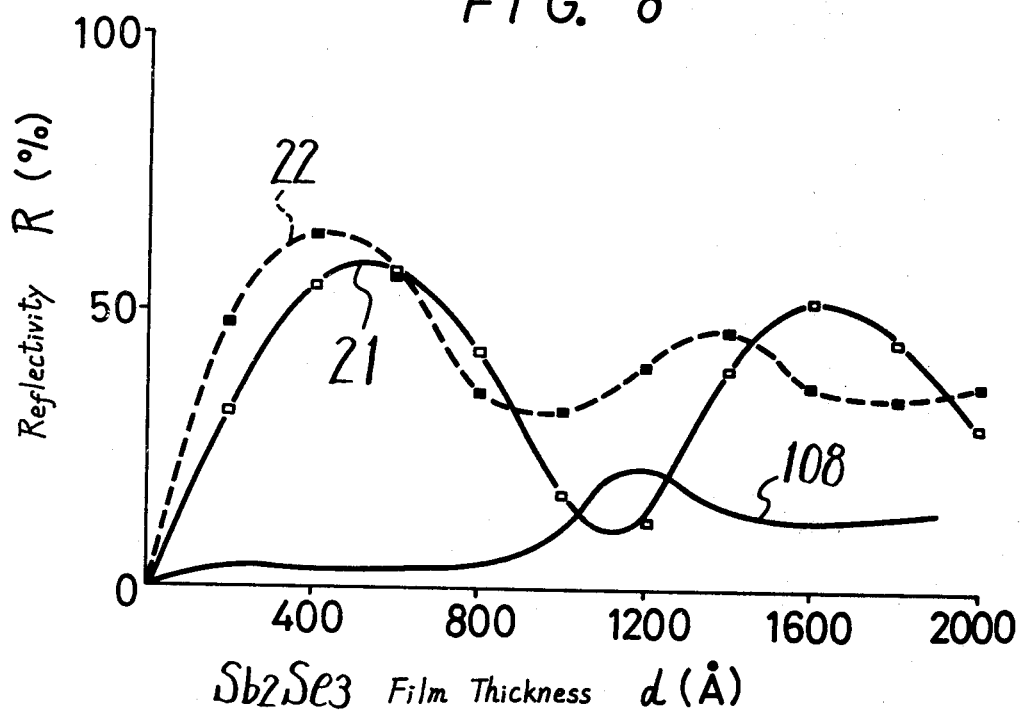

In FIG. 8, a curve 108 shows a light absorptance of the optical information record member before the optical information is recorded, by which it is apparent that the record member has less light absorptance over the whole range and hence the record efficiency is not satisfactory.

EXAMPLE 5

Like the example 3, in this case, an optical information record member is prepared in which the first layer 1 formed of vacuum-evaporated tellurium Te film having a thickness of 400 Å is formed on the glass substrate S on which the second layer 2 made of $Sb_2Te_3$ is formed. Like results in measuring the reflectivity R of the $Sb_2Te_3$ film or the second layer 2 for its thickness d before the semiconductor laser light whose wavelength is 8000 Å is irradiated (before the optical information is recorded) and after the same is irradiated (after the optical information is recorded) are shown respectively by curves 23 and 24 in FIG. 9.

Figure 9:
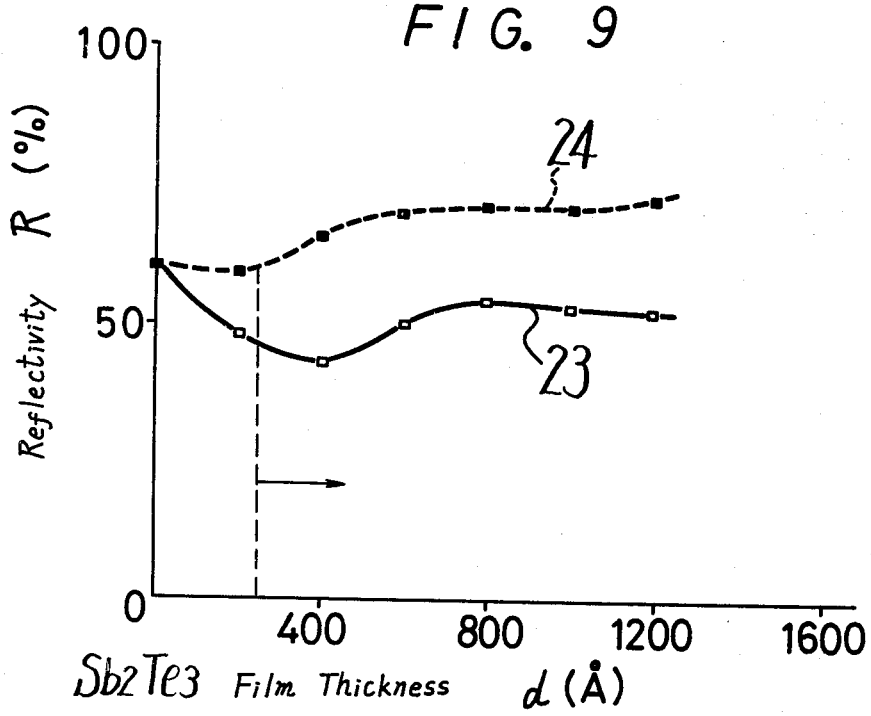

In this case, as it is the same as the description previously made in FIG. 5, the region or area of the film thickness d in which the high recording and/or reproducing sensitivity is achieved, namely, the range of the film thickness d in which before the optical information is recorded the record member shows a low reflectivity R and after the optical information is recorded it shows a higher reflectivity R of more than 15% as compared with that before the optical information is recorded belongs to a range of the film thickness d of about 250 Å or above in FIG. 9. Also, in this case, from a view point of recording the video signal, it is desired that the film thickness d of the second layer 2 is selected to be the thickness from 400 Å to 600 Å.

Comparison Example 3

Figure 10:
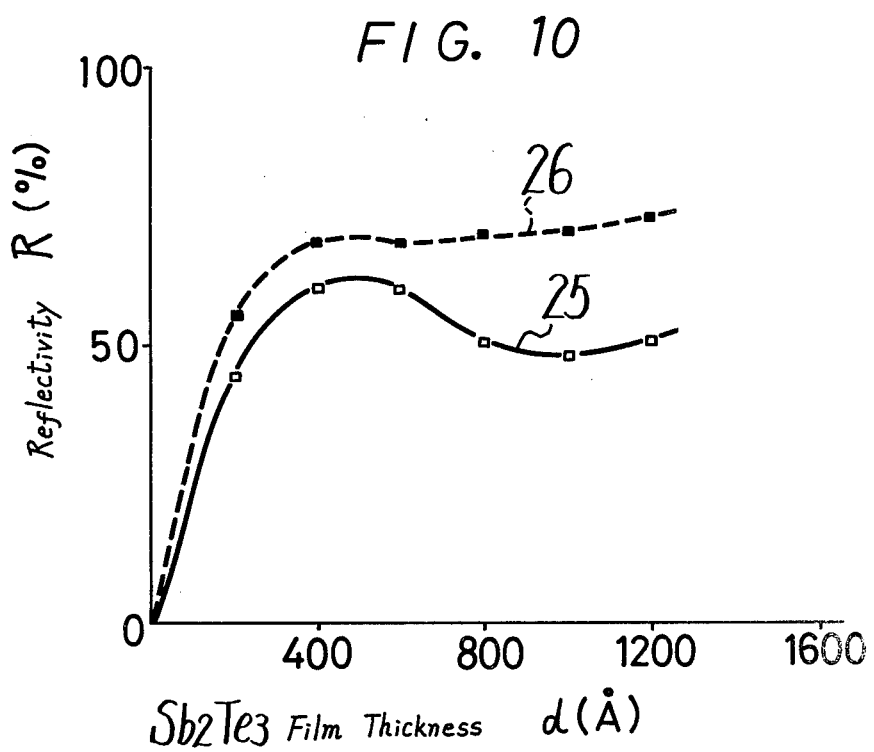

In this example, an optical information record member is prepared in which a single layer of $Sb_2Te_3$ film corresponding to the second layer 2 in the example 5 is formed on the glass substrate S. In this case, results in measuring the reflectivity R of the $Sb_2Te_3$ film for its film thickness d before and after the record member is irradiated by the semiconductor laser whose wavelength is 8000 Å are shown by curves 25 and 26 in FIG. 10.

Also, in this case, like the description made in FIG. 5, the region of the film thickness d of the $Sb_2Te_3$ film in which the high recording and/or reproducing sensitivity is achieved, namely, the range of the film thickness d of the $Sb_2Te_3$ film in which before the optical information is recorded the record member shows a low reflectivity R and after the optical information is recorded it shows a higher reflectivity R of more than 15% as compared with that before the optical information is recorded exists in a range showing a film thickness thicker than that of the vicinity of 400 Å to 600 Å and hence the efficiency of the recording is poor.

EXAMPLE 6

Figure 11:
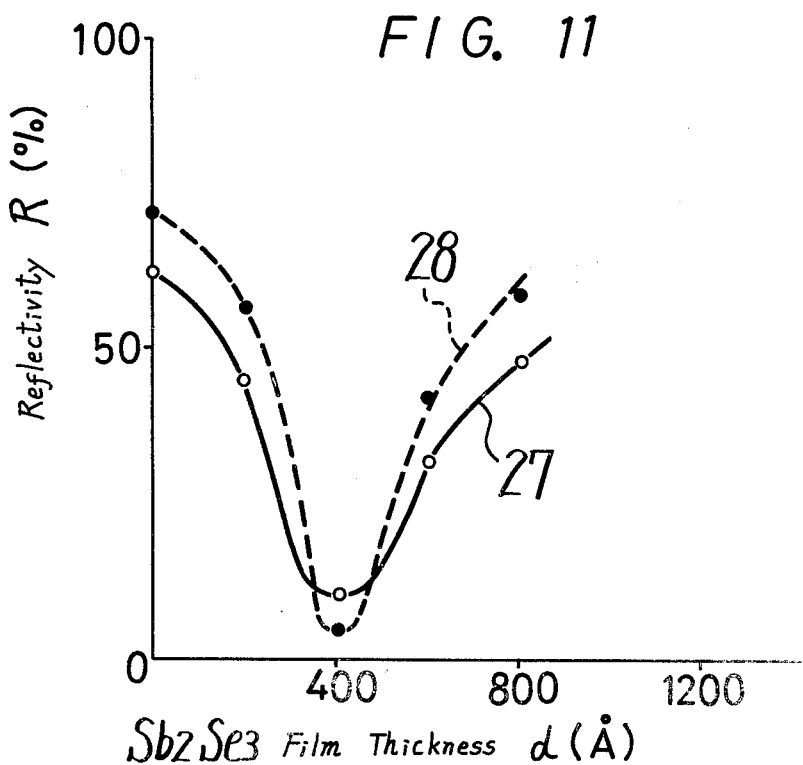

Like the example 3, an optical information record member is prepared in such a manner that the first layer 1 made of the $Sb_2Te_3$ film having a thickness of 530 Å is formed on the glass substrate S on which the second layer 2 made of the $Sb_2Se_3$ film is further formed. In this case, results in measuring the reflectivity R of the record member for its film thickness d before the semiconductor laser whose wavelength is 8000 Å irradiates it (before the optical information is recorded) and after the same irradiates it (after the optical information is recorded) are shown by curves 27 and 28 in FIG. 11.

As described above, according to the optical information record member of the present invention, since the optical information record member is comprised of the first layer 1 for absorbing the recording light so as to convert it into the heat and the second layer 2 whose optical characteristic is varied by such heat, it is not necessary to take the light transmissivity of the second layer 2 into consideration, so that a freedom in selecting the material for forming the second layer 2 can be widened.

Also, even the second layer 2 is comprised of the material having a high light transmissivity, the optical information can be recorded on the record member at low power.

Further, since the recording of the optical information is not formed as the pit which is formed through boring the through-bore or the like but it is carried out based on the change of the optical characteristic, the power or energy required for the recording can be reduced.

In addition, the resolution can be increased in association with the fact that the power needed to record the optical information is very small or low and the recording of the optical information does not depend on the pit as mentioned above, so that the high density recording of the information becomes possible.

Further, when the thickness of the second layer 2 is selected in such a manner that the reflectivity of the record member before the information is recorded on the record member may become small by virtue of the interference effect, the recording efficiency can be increased more and then the power for recording the optical information is reduced more than ever, which therefore enables the resolution to be improved and the high density recording to be carried out.

Also, as described above, since it becomes possible to write or record the information on the record member with low power, users in general can record their own informations on the record member.

In addition, since to generate the recording light and the reproducing light, the laser light source with the same wavelength, in other words, the semiconductor light source which requires a low power is employed and any special treatment for the record member is not required after the information was recorded thereon, the optical information record member according to the present invention has a great advantage in practice such that the optical information can be read out or reproduced from the record member instantly after it being written or recorded thereon and in particular, for example, the optical information can be recorded thereon while the recording of the optical information is monitored.

The above description is given on preferred examples of the invention, but it will be apparent that many modifications and variations could be effected by one skilled in the art without departing from the spirits or scope of the novel concepts of the invention, so that the scope of the invention should be determined by the appended claims only.

I claim as my invention:

1. An optical information record member comprising:
    a substrate;
    a first layer formed on said substrate made of a material having high absorptance of an incident light of a predetermined wavelength in which a part of said incident light is converted to heat, and
    a second layer formed on said first layer made of a material in which absorptance of an incident light having predetermined wavelength is smaller than that of said first layer and in which an optical characteristic for a light having said predetermined wavelength is changed by irradiation of said incident light together with the heat generated in said first layer, said second layer having a thickness of at least 200 but not more than 1600 angstrom whereby an information signal can be recorded on said second layer by the change of the optical characteristics of said second layer.

2. An optical information record member according to claim 1, wherein said first layer has a thickness in a range from 50Å to 1500Å.

3. An optical information record member according to claim 1, wherein said first layer is made of Bi, Te or alloy thereof.

4. An optical information record member according to claim 1, wherein reflectivity of said record member is changed more than 10 % by irradiation of said incident light.

5. An optical information record member comprising:
    a substrate;
    a first layer formed on said substrate made of a material having high absorptance of an incident light having a predetermined wavelength, in which a part of said incident light is converted to heat; and
    a second layer formed on said first layer made of a material in which reflectivity of said record member for a light having said predetermined wavelength is increased by irradiation of said incident light together with the heat generated in said first layer, the thickness of said second layer being such that the reflectivity of the record member is increased more than 15 % after the irradiation of said incident light.

* * * * *